US008368988B2

(12) United States Patent
Kim

(10) Patent No.: US 8,368,988 B2
(45) Date of Patent: Feb. 5, 2013

(54) MICRO SHUTTER DEVICE AND METHOD OF MANUFACTURING THE SAME

(75) Inventor: Che-heung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 654 days.

(21) Appl. No.: 12/539,255

(22) Filed: Aug. 11, 2009

(65) Prior Publication Data

US 2010/0142024 A1 Jun. 10, 2010

(30) Foreign Application Priority Data

Dec. 9, 2008 (KR) ........................ 10-2008-0124735

(51) Int. Cl.
*G02B 26/02* (2006.01)
*G03B 9/34* (2006.01)

(52) U.S. Cl. ........ 359/230; 359/232; 396/485; 396/487; 396/488

(58) Field of Classification Search .................. 359/230, 359/232, 233, 227; 396/483, 485, 487, 488
See application file for complete search history.

(56) References Cited

U.S. PATENT DOCUMENTS

| 5,519,240 | A  | * | 5/1996  | Suzuki | 257/315 |
| 5,552,925 | A  | * | 9/1996  | Worley | 359/230 |
| 6,288,829 | B1 |   | 9/2001  | Kimura |  |
| 6,865,009 | B2 | * | 3/2005  | Nishioka | 359/295 |
| 7,025,468 | B2 | * | 4/2006  | Nishioka et al. | 359/846 |
| 7,099,084 | B2 | * | 8/2006  | Bi | 359/565 |
| 7,675,665 | B2 | * | 3/2010  | Hagood et al. | 359/233 |
| 7,845,865 | B2 | * | 12/2010 | Viglione et al. | 396/463 |
| 8,049,713 | B2 | * | 11/2011 | Sampsell | 345/108 |
| 8,059,326 | B2 | * | 11/2011 | Miles | 359/290 |
| 8,061,910 | B2 | * | 11/2011 | Kim et al. | 396/481 |
| 8,149,512 | B2 | * | 4/2012  | Kim et al. | 359/665 |
| 2003/0214734 | A1 | * | 11/2003 | Nishioka et al. | 359/846 |
| 2004/0179280 | A1 | * | 9/2004  | Nishioka | 359/846 |
| 2005/0047721 | A1 | * | 3/2005  | Chen et al. | 385/40 |
| 2005/0117223 | A1 | * | 6/2005  | Bi | 359/578 |
| 2005/0146794 | A1 | * | 7/2005  | Menon et al. | 359/619 |
| 2006/0125746 | A1 | * | 6/2006  | Sallese et al. | 345/85 |
| 2006/0187563 | A1 | * | 8/2006  | Nishioka et al. | 359/846 |
| 2007/0008619 | A1 |   | 1/2007  | Cha et al. |  |
| 2007/0217120 | A1 | * | 9/2007  | Sallese et al. | 361/278 |
| 2009/0142050 | A1 | * | 6/2009  | Kim et al. | 396/480 |
| 2010/0118373 | A1 | * | 5/2010  | Kim | 359/230 |
| 2010/0142024 | A1 | * | 6/2010  | Kim | 359/230 |

FOREIGN PATENT DOCUMENTS

| KR | 98-701096 A    | 4/1998 |
| KR | 1020070006116 A | 1/2007 |
| WO | 2006/091791 A2 | 8/2006 |

* cited by examiner

*Primary Examiner* — John Lee
(74) *Attorney, Agent, or Firm* — Sughrue Mion, PLLC

(57) ABSTRACT

A micro shutter device and a method of manufacturing the micro shutter device are provided. A transparent substrate is provided. A barrier is formed on the substrate to partition a unit pixel. A pattern layer is formed with a transparent material to have a transparent first pattern portion on the substrate in the unit pixel. A movable plate is arranged to face the pattern layer, has an opaque second pattern layer corresponding to a shape of the first pattern portion, and is configured to transmit light therethrough except the second pattern portion. An actuator is for moving the movable plate. Therefore, light leakage due to diffraction can be prevented, resulting in increasing contrast ratio and improving light efficiency.

10 Claims, 10 Drawing Sheets

MICRO SHUTTER DEVICE AND METHOD OF MANUFACTURING THE SAME

CROSS REFERENCE TO RELATED APPLICATION

This application claims benefit under 35 U.S.C. §119(a) of Korean Patent Application No. 10-2008-124735, filed on Dec. 9, 2008, the disclosure of which is incorporated herein in its entirety by reference.

BACKGROUND

1. Field

The following description relates to a micro shutter device and a method of manufacturing the same, and more particularly, to a micro shutter device applicable to a display device or an optical switching device and a method of manufacturing the micro shutter device.

2. Description of the Related Art

A liquid crystal display (LCD) has a more advanced visibility and less power consumption, and generates less heat compared to the cathode ray tube (CRT). Thus, the LCD is widely used as a next generation display device, along with a field emission display (FED) for a cellular phone, a computer monitor and television.

The LCD selectively transmits light radiated from a light source such as a backlight to represent an image. To this end, when voltage is applied to liquid crystal, orientation of molecules of the liquid crystal is changed. The liquid crystal acts as an optical shutter that selectively transmits light in association with the change of the orientation. However, since it is impossible to block light only with the liquid crystal, a front surface and a rear surface of the liquid crystal display are, respectively, provided with polarizing films which allow light in a predetermined polarizing direction to pass therethrough.

As described above, in the LCD, liquid crystal and the polarizing films are used to selectively transmit light, but also cause light loss, and consequently only 6 to 8% of the total amount of light originally radiated from the backlight is transmitted effectively. That is, the liquid crystal and the polarizing films cause the low light efficiency of the LCD.

Recently, various attempts are conducted to develop a micro lens shutter using a micro electro mechanical system instead of removing liquid crystal and a polarizing film in order to overcome the low light efficiency of the LCD.

SUMMARY

Accordingly, in one aspect, there are provided a micro shutter device and a method of manufacturing the same which prevents light leakage, thereby increasing contrast ratio and improving light efficiency.

According to an aspect, there is disclosed a micro shutter device including a transparent substrate, a barrier, a pattern layer, a movable plate, and an actuator.

The transparent substrate is formed on the substrate to partition a unit pixel. The barrier is made of an opaque material having a transparent first pattern portion on the substrate in the unit pixel. The movable plate faces the pattern layer and has an opaque second pattern portion in correspondence to the first pattern portion to transmit light through a portion excluding the second pattern portion. The actuator moves the movable plate.

According to another aspect, there is disclosed a micro shutter device manufacturing method including forming a pattern layer made of an opaque material and having a transparent first pattern portion on a transparent substrate, forming a sacrificial layer on the substrate and the pattern layer, forming a movable plate, forming an actuator, removing the sacrificial layer, and forming a barrier on the substrate.

The movable plate has a second pattern portion made of an opaque material in correspondence to the first pattern portion on the sacrificial layer. The actuator is connected to the second pattern portion on the sacrificial layer such that the movable plate is separated from the pattern layer when the sacrificial layer is removed later. The barrier is formed to partition a unit pixel.

Other aspects will become apparent to those skilled in the art from the following detailed description, which, taken in conjunction with the attached drawings, discloses exemplary embodiments of the invention.

BRIEF DESCRIPTION OF THE DRAWINGS

Elements, aspects, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves those of ordinary skill in the art. Descriptions of well-known functions and structures are omitted to enhance clarity and conciseness.

Figure 1:
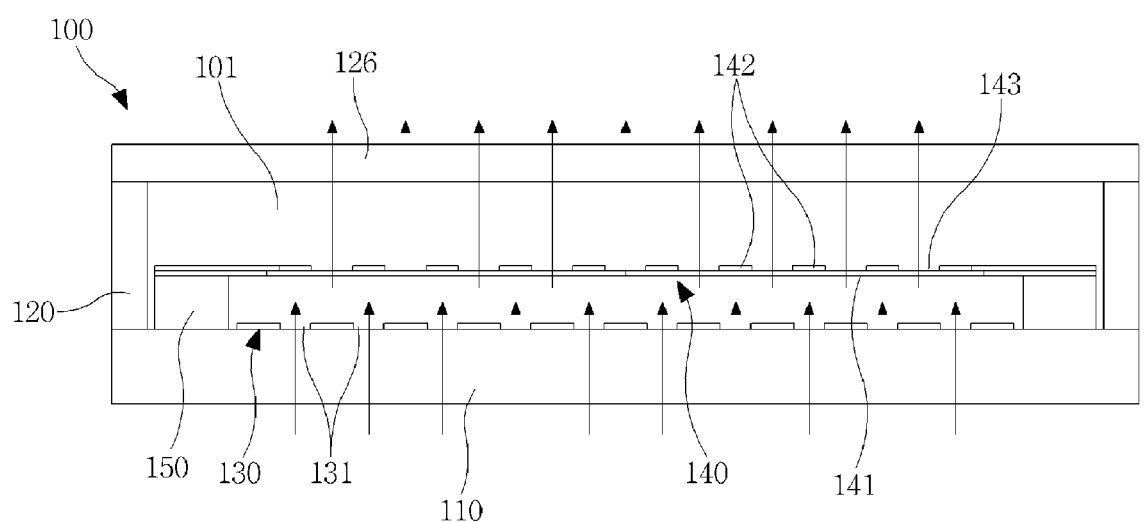
FIG. 1 is a diagram illustrating a cross-sectional view of an exemplary micro shutter device.
Figure 2:
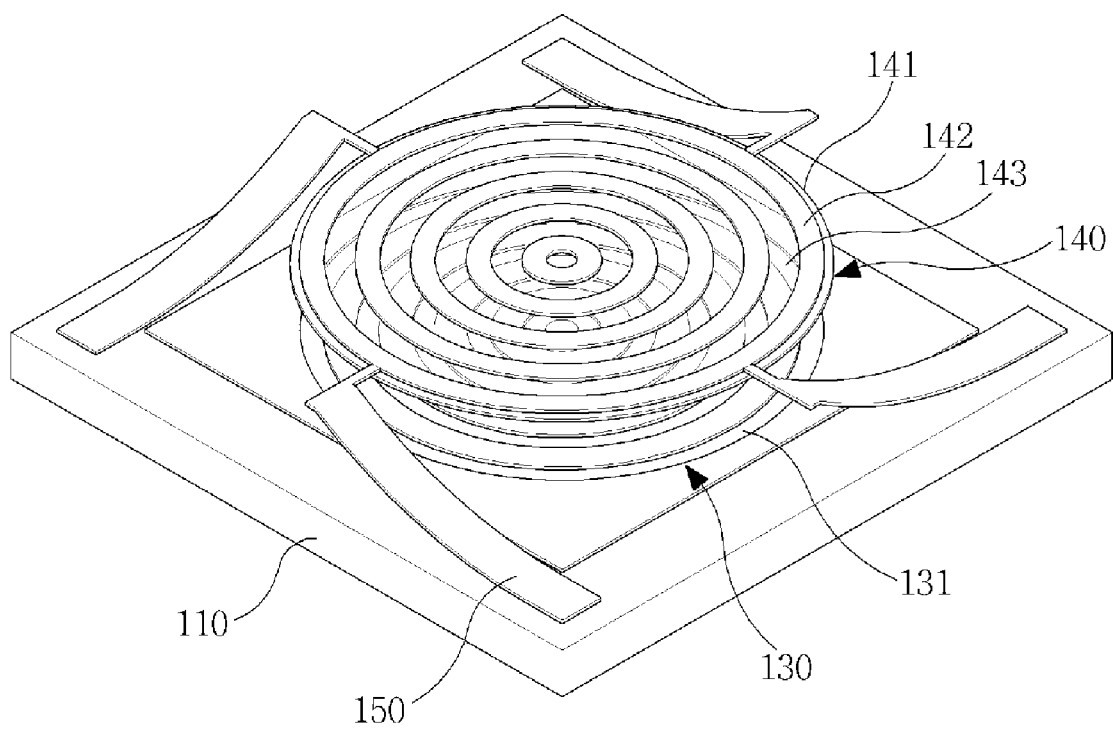
FIG. 2 is a diagram illustrating a perspective view of a unit pixel of the micro shutter device of FIG. 1.
Figure 3:
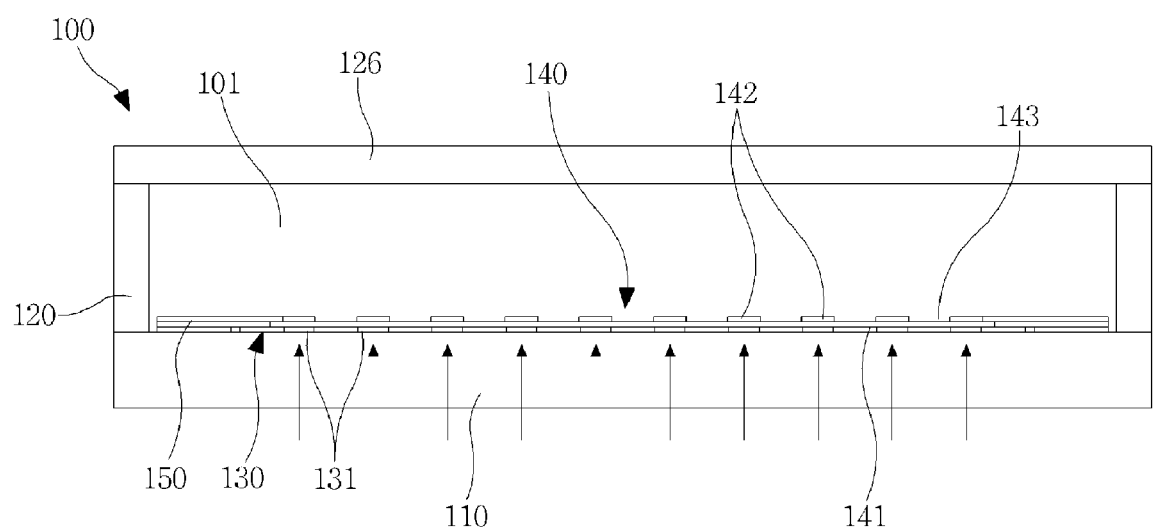
FIG. 3 is a diagram illustrating a cross-sectional view of the micro shutter device of FIG. 1 to explain an operation of a movable plate according to application of voltage.
Figure 4:
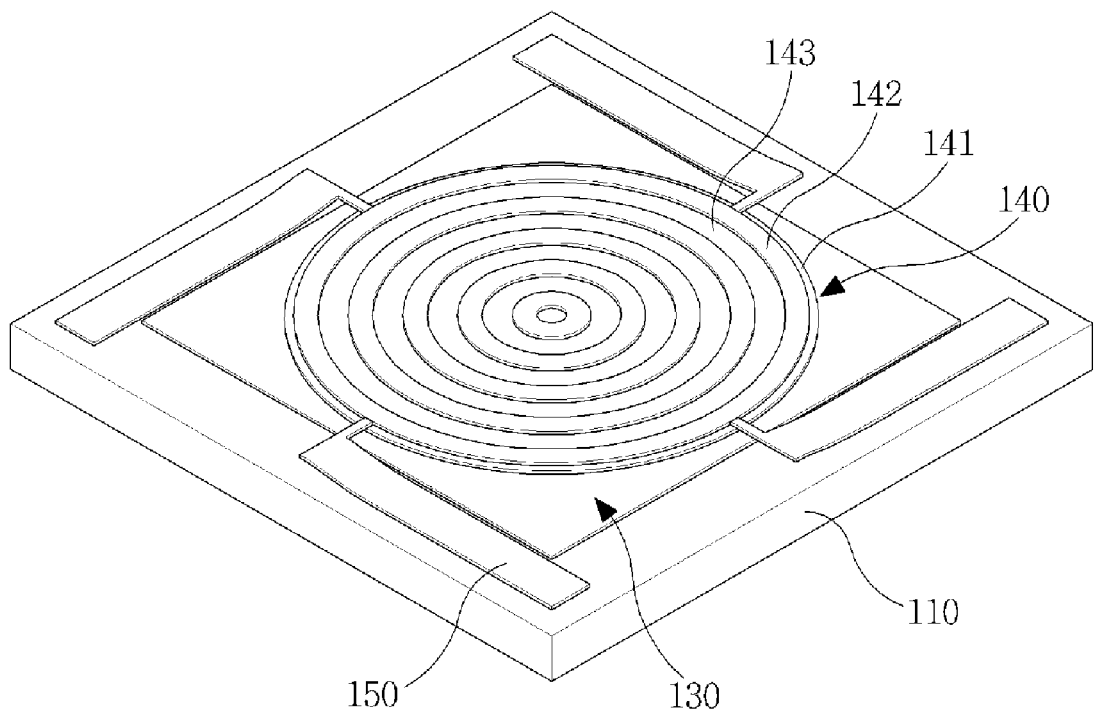
FIG. 4 is a diagram illustrating a perspective view of the unit pixel of the micro shutter device of FIG. 3.

FIG. 1 is a diagram illustrating a cross-sectional view of an exemplary micro shutter device 100, and FIG. 2 is a diagram illustrating a perspective view of a unit pixel of the micro shutter device 100. FIG. 3 is a diagram illustrating a cross-sectional view of the micro shutter device 100 of FIG. 1 to explain an operation of a movable plate 140, and FIG. 4 is a perspective view of the unit pixel of the micro shutter device 100 in FIG. 3.

Referring to FIGS. 1 to 4, the micro shutter device 100 includes a substrate 110, a barrier 120, a pattern layer 130, a movable plate 140, and an actuator 150.

The substrate 110 is made of a transparent material to allow light from an external light source such as a backlight to pass therethrough. For example, the substrate 110 may be made of glass.

The barrier 120 is formed on the substrate 110 to partition the substrate into a unit pixel 101. If the micro shutter device 100 is employed to a display apparatus, the barrier 120 may be formed to partition a plurality of unit pixels 101 to represent an image. The barrier 120 may be made of a dielectric material. On the top of the barrier 120, a cover 126 made of a transparent material is provided to close the unit pixel 101.

The pattern layer 130 is made of an opaque material and has a transparent first pattern portion 131 formed on the substrate 110 in the unit pixel 101. For example, the pattern layer 130 has the transparent first pattern portion 131 formed by coating a top surface of the substrate 110 with an opaque material with a predetermined thickness and removing the coating material on the top surface of the substrate 110 in correspondence with a shape of the first pattern portion 131 until the substrate 110 is exposed. That is, the exposed top surface of the transparent substrate 110 corresponding to the shape of the first pattern portion 131 enables the first pattern portion 131 to appear transparent.

Therefore, on the pattern layer 130, the first pattern portion 131 can transmit light incident through the substrate 110, and since the remaining portion of the pattern layer 130, excluding the first pattern portion 131, is opaque, light incident through the substrate 110 is blocked.

In the unit pixel 101, the pattern layer 130 is formed to be placed inside the actuator 150 which is formed on the border of the unit pixel 101, and may be formed extending to the installation position of the actuator 150.

The movable plate 140 is formed to face the pattern layer 130. The movable plate 140 includes a second pattern portion 142. The second pattern portion 142 corresponds to the first pattern portion 131 and is made of an opaque material, so that light can be transmitted through the remaining portion of the movable plate 140, excluding the second pattern portion 142. For example, the movable plate 140 may be configured to have a transparent base portion 141 on which the second pattern portion 142 made of an opaque material is formed.

The second pattern portion 142 may have the same pattern as the first pattern portion 131. Here, the second pattern portion 141 may overlap the first pattern portion 131 to prevent light leakage which may be caused by the diffraction between the first and second pattern portions 131 and 141 while the movable plate 140 is contacting the pattern layer 130.

The actuator 150 is to move the movable plate 140. As shown in FIGS. 1 and 2, the actuator 150 is formed on the substrate 110 and is separated from the substrate 110 with its end curved when no voltage is applied. The actuator 150 has the curved end connected to the movable plate 140 to separate the movable plate 140 from the pattern layer 130.

Accordingly, a space is generated between the first pattern portion 131 and the second pattern portion 142. Then, the light incident through the substrate 110 passes through the first pattern portion 131 to travel into the space, and the light in the space may be transmitted through the remaining portion of the movable plate 140, excluding the second pattern portion 142. In this case, the light entering the space is transmitted while being repeatedly reflected between the second pattern portion 142 and the remaining portion of the pattern layer 130, excluding the first pattern portion 131, and thus approximately 80% or more of light efficiency can be obtained.

Moreover, the actuator 150 becomes horizontally flat to enable the movable plate 140 to contact the pattern layer 130 when voltage is applied as shown in FIGS. 3 and 4. For example, a voltage more than the pull-in voltage is applied between the actuator 150 and the pattern layer 130, electrostatic force is generated in the actuator 150. Then, the actuator 150 is pulled toward the pattern layer 130 by the electrostatic force, thereby becoming horizontally flat.

As a result, the movable plate 140 is moved toward the pattern layer 130 and contacts the pattern layer 130. The second pattern portion 142 completely overlaps the first pattern portion 131 to tightly contact the first pattern portion 131, so that the light incident through the substrate 110 can be thoroughly blocked.

As such, when the first pattern portion 131 and the second pattern portion 142 thoroughly contact each other without a gap, light leakage caused by diffraction may be prevented. Hence, the exemplary unit pixel 101 is applicable to all types of backlights such as a scattered light type backlight and a collimated light type backlight, and high contrast ratio may be achieved regardless of the type of the backlight.

If the voltage is no longer applied between the actuator 150 and the pattern layer 130, as shown in FIGS. 1 and 2, the electrostatic force generated in the actuator 150 is eliminated, and thus the actuator 150 returns to its initial state where it has a bent shape, by the elastic resilience of the material used for the actuator 150. As a result, the movable plate 140 becomes apart from the pattern layer 130, thereby enabling emitting light. As such, the movable plate 140 can transmit or block light by the actuator 150 of which the shape is changed according to application of voltage, without the conventional liquid crystal or a polarizing film.

In addition, there may be provided a plurality of actuators 150. For example, if a cross-section of the unit pixel 101 is rectangular, four actuators 150 are provided to be disposed at each edge of the unit pixel 101 with a predetermined distance from one another. Moreover, three or more actuators 150 may be provided with a predetermined distance from one another so as to stably move the movable plate 140.

To minimize interference by the actuators 150 while the light entering between the movable plate 140 and the pattern layer 130 is reflected repeatedly, the actuators 150 may be arranged on the border of the movable plate 140. Here, each of the actuators 150 may have an end fixed to the substrate 110 and the other end connected to the edge of the movable plate 140 on the border of the lower region of the unit pixel 101. Also, each of the actuators 150 may be curved inwardly from its end fixed to the substrate 110.

Since each of the actuators 150 have a curved shape when no voltage is applied and then become straightened when the voltage is applied, the actuators 150 can be operated with a lower operating voltage compared to the case where the actuator stays straightened when no voltage is applied and then becomes curved when the voltage is applied. Also the operating speed can be increased.

Each of the actuators 150 is formed of two layers with different residual stresses so that it can have a curved shape. For example, each of the actuators 150 may include an electrode layer and an insulating layer stacked on a surface of the electrode layer. In this case, voltage is applied to the electrode layer and electrostatic force is generated in the actuator 150. The electrode layer is made of a conductive material and the insulating layer is made of an insulating material.

The electrode layer may have tensile residual stress. The insulating layer may have compressive residual stress or tensile residual stress smaller than that of the electrode layer, or have no residual stress. In forming the actuator 150, the insulating layer is placed closer to the substrate 110 than the electrode layer, and thus the top surface of the actuator 150 may be curved inward to the substrate 110.

For example, if each of the pattern layer 130 and the second pattern portion 142 is made of an opaque material such as metal having conductivity, the electrode layer may contact the second pattern portion 142. In this case, a voltage may be applied between the pattern layer 130 and one of the electrode layer and the second pattern portion 142.

The first pattern portion 131 and the second pattern portion 142 may be formed in various shapes. For example, the first pattern portion 131 may be formed of a plurality of concentric circular slits. Correspondingly, the second pattern portion 142 may also be formed of a plurality of concentric circular strips. In this case, the movable plate 140 is circular or rectangular, and may have a plurality of concentric circular slits 143 on the portion excluding the second pattern portion 142. The width of each strip of the second pattern portion 142 may be wider than the width of each slit of the first pattern portion 131. This configuration may prevent the light leakage caused by diffraction between the contacting first pattern portion 131 and the second pattern portion 142.

Although not illustrated in drawings, for another example, the first pattern portion 131 may be formed of a plurality of concentric rectangular slits. Correspondingly, the second pattern portion 142 may be formed of a plurality of concentric rectangular strips. In this case, the movable plate 140 is rectangular, and may have a plurality of concentric rectangular slits on the portion excluding the second pattern portion 142.

For another example, the first pattern portion 131 may be formed of a plurality of radial slits arranged radially from the center of the movable plate 140, and correspondingly, the second pattern portion 142 may be formed of a plurality of radial strips. In this case, if the size and shape of each radial slits and strips are of appropriately shape, the movement of each actuator 150 between straightening and bending can rotate the movable plate 140, and through this rotation, gradation of light can be transmitted according to the rotational angle of the movable plate 140. Specifically, the radial strips are configured such that the amount of transmittance becomes zero when the movable plate 140 contacts the pattern layer 130 and becomes the maximum when the movable plate 140 is the farthest from the pattern layer 130 within a predetermined range of distance, it is possible to control the amount of transmittance according to the rotational angle of the movable plate 140. Consequently, the representation of light gradation can be achieved.

Figure 5:
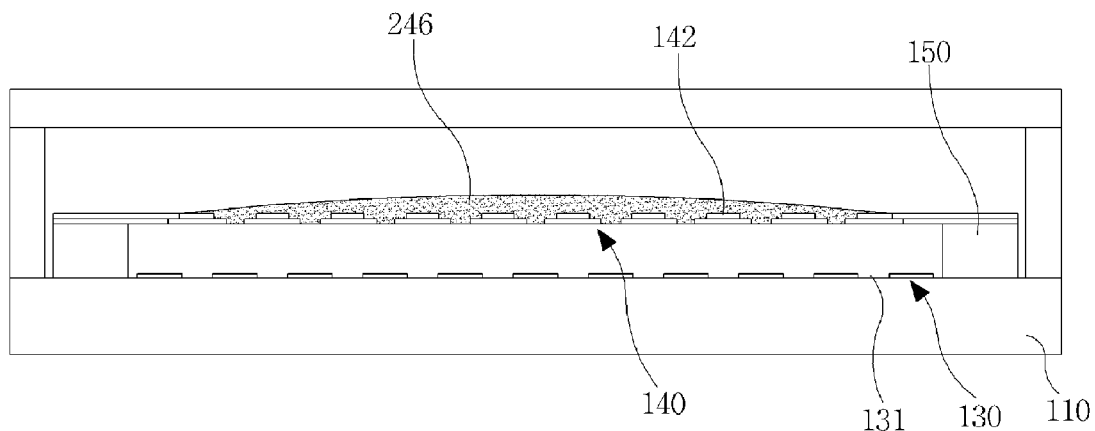
FIG. 5 is a diagram illustrating a cross-sectional view of another exemplary movable plate in FIG. 2.

In addition, as shown in FIG. 5, the movable plate 140 may further include a convex lens portion 246. The convex lens portion 246 is to collect and focus light rays passing through the first pattern portion 131 on the center of the unit pixel 101. The convex lens portion 246 may be formed all over the surface of the movable plate 140 with its middle portion curved outwardly. When the light is focused on the center by the convex lens portion 246, a dead zone inside the unit pixel 101 can be prevented, and thus there may be a benefit of reducing the area of cross-section of the unit pixel 101. In this case where the convex lens portion 246 is further included in the movable plate 140, the base portion 141 of the movable plate 140 may be configured to be partly open, excluding the second pattern portion 142.

Figure 6:
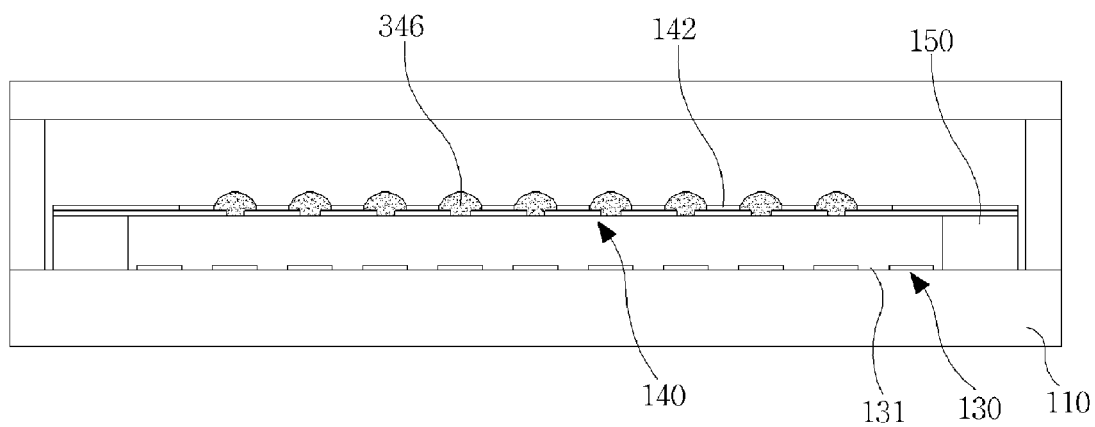
FIG. 6 is a diagram illustrating a cross-sectional view of another exemplary movable plate in FIG. 2.

For another exemplary example, as shown in FIG. 6, the movable plate 140 may have a plurality of convex lens portions 346 in order to focus light rays passing through the first pattern portion 131 on the center. Here, the convex lens portions 346 may be formed to correspond to the respective concentric circular slits 143 formed on the movable plate 140. That is, each of the convex lens portions 346 may be formed to match with each of the concentric circular slits 143 and arranged concentrically.

A exemplary method of manufacturing a micro shutter device 100 will now be described in detail with reference to FIGS. 7 to 15. This method will be described on the assumption that the movable 140 has a plurality of convex lens portions 346 formed thereon as shown in FIG. 6.

Figure 7:
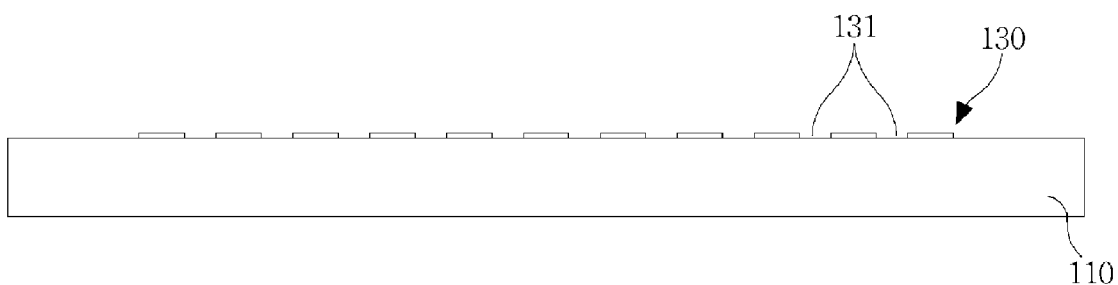
FIGS. 7 to 15 are diagrams for explaining an exemplary method of manufacturing a micro shutter device.

First, as shown in FIG. 7, a pattern layer 130 is formed on a transparent substrate 110 with an opaque material to have a transparent first pattern portion 131 by forming a pattern on the transparent substrate 100. Here, the first pattern portion 131 may be formed to appear transparent by patterning a top surface of the substrate 100 to be exposed, corresponding to a shape of the first pattern portion 131.

The shape of the first pattern portion 131 may be formed of a plurality of concentric rectangular slits or concentric circular slits. The pattern layer 130 may be formed to be placed in a space defined by the unit pixel 101. The pattern layer 130 may be made of an opaque conductive metal material.

Figure 8:
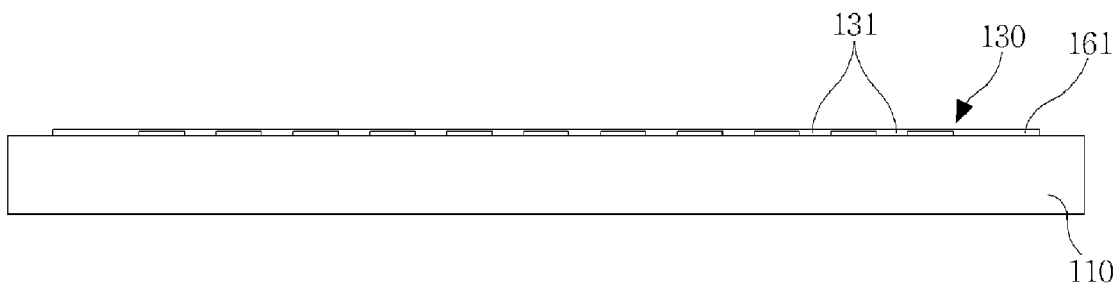

Then, as shown in FIG. 8, a sacrificial layer 161 is formed on the substrate 110 and the pattern layer 130. The sacrificial layer 161 is to be removed once the movable plate 140 and an actuator 150 are completely formed, and allows the movable plate 140 to be separated and be apart from the pattern layer 130 while a top surface of the actuator 150 is upwardly curved.

Figure 9:
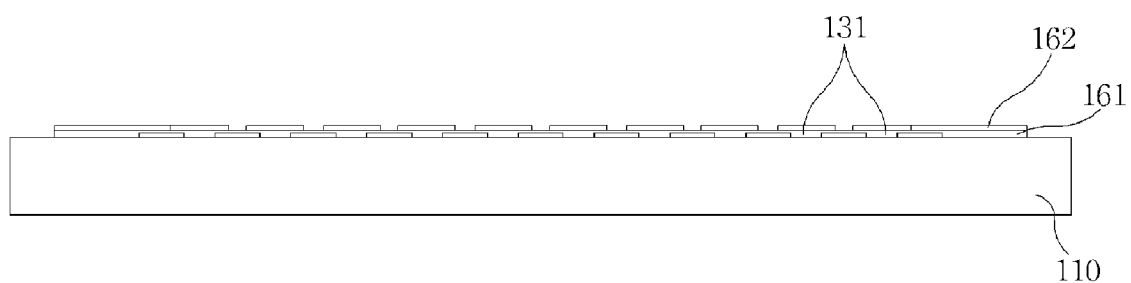

Subsequently, as shown in FIG. 9, an insulating layer 162 is formed on the sacrificial layer 161. The insulating layer 162 may be patterned in such a way that a region where the convex lens portions 346 are to be formed is open. The insulating layer 162 may be made of a transparent insulating material. Also, the insulating layer 162 may be a base portion 141 of the movable plate 140.

The insulating layer 162 may be formed in such a way not to have residual stress. In this case, an additional insulating layer may not need to be formed during forming the actuator 150. That is, the actuator 150 may be manufactured by forming an electrode layer 162 having tensile residual stress on the insulating layer 162. However, the procedure of forming the insulating layer 162 may be possibly omitted.

Figure 10:
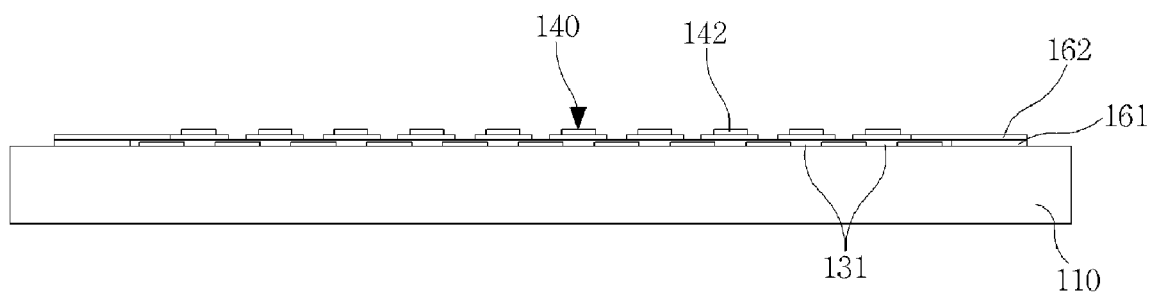

As shown in FIG. 10, following of forming the insluting layer 162, a second pattern portion 142 is formed by patterning an opaque material on the insulating layer 162 to form the movable plate 140. Here, the second pattern portion 142 may be formed to correspond to the shape of the first pattern portion 131. For example, if the first pattern portion 131 is formed of concentric circular slits, the second pattern portion 142 may be formed of concentric circular strips.

For another example, if the first pattern portion 131 is formed of concentric rectangular slits, the second pattern portion 142 may be formed of concentric rectangular strips. In the forming of the second pattern portion 142, the width of each strip of the second pattern portion 142 may be set to be greater than the width of that of the first pattern portion 131. The second pattern portion 142 may be made of an opaque conductive metal material.

Figure 11:
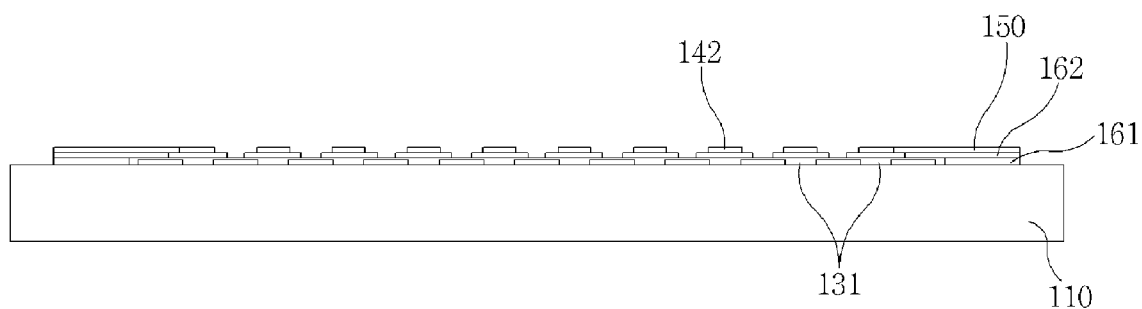

As shown in FIG. 11, the actuator 150 is formed to be connected to the second pattern portion 142 on the insulating layer 162. Moreover, the actuator 150 is formed in such a manner that the movable plate 140 can be separated from the pattern layer 130 when the sacrificial layer 161 is removed later. An insulating layer dedicated to the actuator 150 may be formed on the insulating layer 162. Here, the insulating layer dedicated to the actuator 150 may be formed to have compressive residual stress or tensile residual stress, or not to have any residual stress. Then, an electrode layer having tensile residual stress is formed on the insulating layer dedicated to the actuator 150 to complete the actuator 150. If the insulating layer dedicated to the actuator 150 is formed to have tensile residual stress, the electrode layer may be provided to have greater tensile residual stress than that of the insulating layer dedicated to the actuator 150.

If the procedure of forming the insulating layer 162 shown in FIG. 9 is omitted, an insulating layer and an electrode layer are sequentially formed on the sacrificial layer 161 to manufacture the actuator 150. To form the actuator 150, a deposition method may be used.

Figure 12:
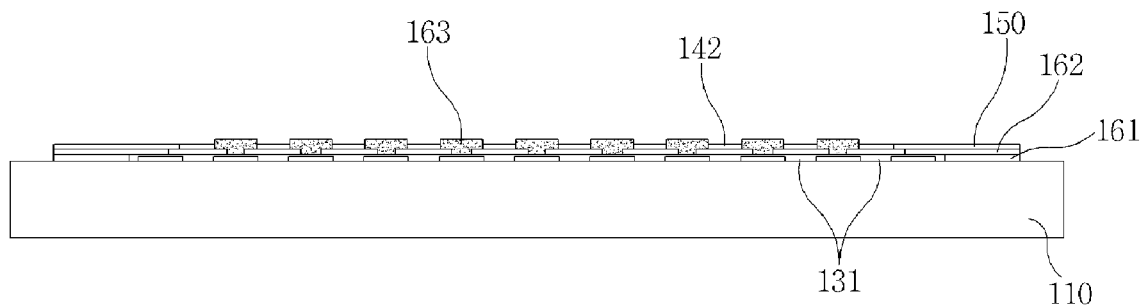
Figure 13:
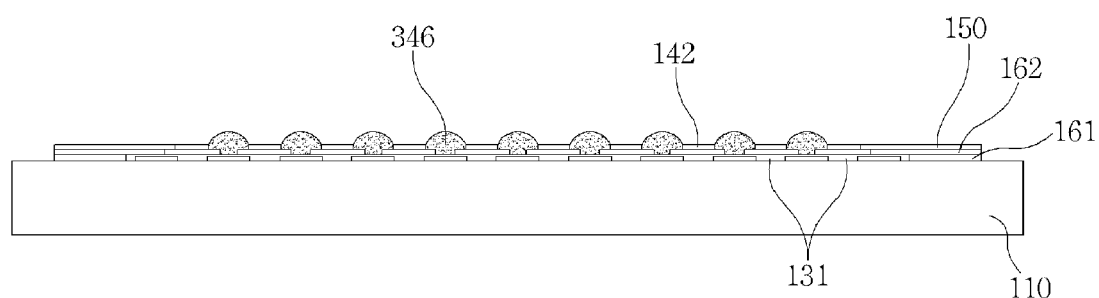

Next, the convex lens portions 346 are formed. As shown in FIG. 12, a lens forming material 163 is provided and patterned on the openings on the movable plate 140 excluding the second pattern portion 142. Then, as shown in FIG. 13, the lens forming material 163 is hardened by, e.g. a photothermal method in a manner that each of the convex lens portions 346 is formed. Alternatively, the lens forming material may be provided all over the top surface of the movable plate 140 and hardened by, e.g. a photothermal method to form a single convex lens portion 246 (referring to FIG. 5).

Figure 14:
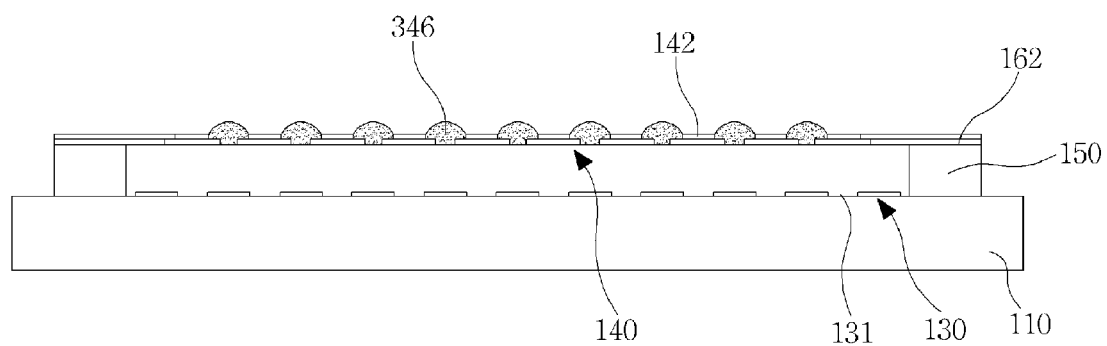
Figure 15:
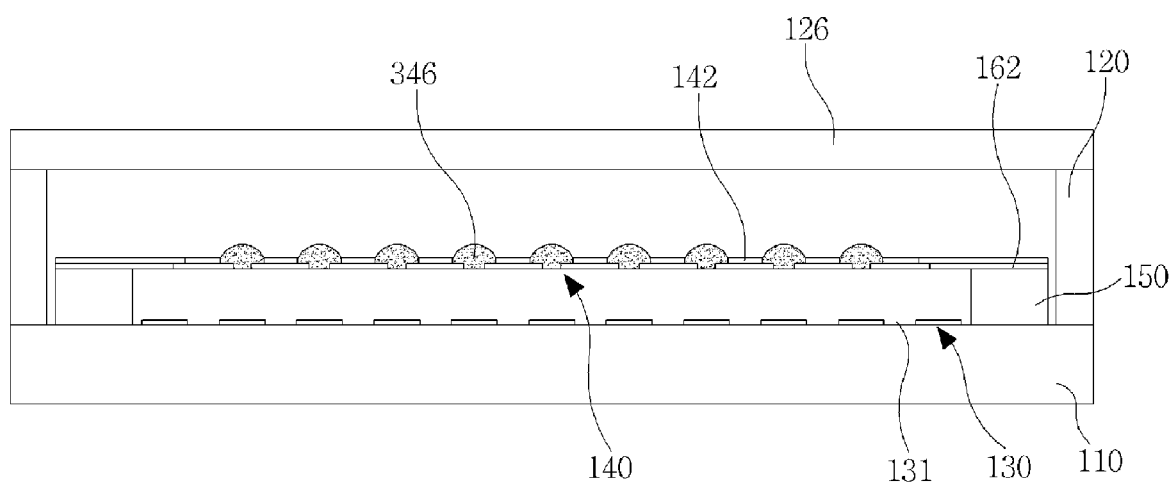

Then, as shown in FIG. 14, the sacrificial layer 161 is removed. At this time, the sacrificial layer 161 may be removed by, e.g. a dry release method. Once the sacrificial layer 161 is removed, a top surface of the actuator 150 is curved upwardly, and consequently, the movable plate 140 is separated and apart from the pattern layer 130. Subsequently, as shown in FIG. 15, a barrier 120 is formed on the substrate 110 to partition the unit pixel 101, and a transparent cover 126 is provided on an upper portion of the barrier 120, allowing the unit pixel 101 to be closed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A micro shutter device comprising:
   a transparent substrate;
   a barrier formed on the transparent substrate to partition the transparent substrate into a unit pixel;
   a pattern layer made of an opaque material having a transparent first pattern portion, formed on the transparent substrate in the unit pixel;
   a movable plate facing the pattern layer and having an opaque second pattern portion corresponding to the transparent first pattern portion to transmit light through a portion excluding the opaque second pattern portion; and
   an actuator which is formed on the transparent substrate, has an end connected to the moveable plate and moves the movable plate.

2. The micro shutter device of claim 1, wherein the actuator separates the movable plate from the pattern layer to transmit light passing through the transparent substrate, from an external light source when no voltage is applied to the actuator, and moves the movable plate to contact the pattern layer to block light passing through the transparent substrate when voltage is applied to the actuator.

3. The micro shutter device of claim 1, wherein the transparent first pattern portion is formed of a plurality of concentric circular slits or a plurality of concentric rectangular slits, the opaque second pattern portion is formed of a plurality of concentric circular strips or a plurality of concentric rectangular strips to correspond to the transparent first pattern portion and a width of each strip of the opaque second pattern portion is wider than a width of each slit of the transparent first pattern portion.

4. The micro shutter device of claim 3, wherein a portion of the movable plate excluding the opaque second pattern portion is formed of concentric slits.

5. The micro shutter device of claim 4, wherein a convex lens portion is formed over a whole surface of the movable plate such that light passing through the transparent first pattern portion is focused on a center of the unit pixel.

6. The micro shutter device of claim 4, wherein a plurality of convex lens portions are formed on the movable plate to correspond to the concentric stilts, respectively, such that light passing through the transparent first pattern portion is focused on a center of the unit pixel.

7. The micro shutter device of claim 1, wherein there are a plurality of actuators and each of the plurality of actuators has one end fixed to the transparent substrate and another end connected to an edge of the movable plate.

8. The micro shutter device of claim 7, wherein each of the plurality of actuators includes an electrode layer having tensile residual stress, and an insulating layer which is stacked on one surface of the electrode layer and placed closer to the substrate than the electrode layer and has compressive residual stress, no residual stress, or tensile residual stress smaller than tensile residual stress of the electrode layer.

9. The micro shutter device of claim 1, wherein each of the pattern layer and the opaque second pattern portion is made of an opaque conductive material, the opaque second pattern portion contacts an electrode layer of the actuator and a voltage is applied between either the electrode layer of the actuator or the opaque second pattern portion and the pattern layer.

10. The micro shutter device of claim 7, wherein there are four actuators and each of the plurality of actuators are arranged a predetermined distance apart from another of the plurality of actuators.

\* \* \* \* \*